(12) United States Patent
Hama (10) Patent No.: US 7,952,065 B2
(45) Date of Patent: May 31, 2011

(54) POSITION DETECTOR AND A DETECTED ELEMENT HAVING A PATTERN FOR GENERATING A POSITION SIGNAL FORMED THEREON

(75) Inventor: Nobuharu Hama, Hachinohe (JP)

(73) Assignee: Tamagawa Seiki Co., Ltd., Aomori (JP)

( * ) Notice: Subject to any disclaimer, the term of this patent is extended or adjusted under 35 U.S.C. 154(b) by 708 days.

(21) Appl. No.: 10/593,203

(22) PCT Filed: Sep. 16, 2004

(86) PCT No.: PCT/JP2004/013557
§ 371 (c)(1),
(2), (4) Date: Apr. 22, 2008

(87) PCT Pub. No.: WO2005/090922
PCT Pub. Date: Sep. 29, 2005

(65) Prior Publication Data
US 2008/0232215 A1   Sep. 25, 2008

(30) Foreign Application Priority Data

Mar. 22, 2004 (JP) ................... 2004-083540
Jul. 27, 2004 (JP) ................... 2004-218265

(51) Int. Cl.
*G01D 5/34* (2006.01)
(52) U.S. Cl. .............. 250/231.13; 250/231.18
(58) Field of Classification Search ........... 250/231.13, 250/231.16, 231.18; 341/13, 31; 356/373–375
See application file for complete search history.

(56) References Cited

U.S. PATENT DOCUMENTS 5,936,236 A * 8/1999 Setbacken et al. ....... 250/231.13

FOREIGN PATENT DOCUMENTS

| JP | 58-055802 | 4/1983 |
| JP | 61-140967 | 9/1986 |
| JP | 63 67521 | 3/1988 |
| JP | 01189518 A * | 7/1989 |
| JP | 1-117716 | 8/1989 |
| JP | 05-312514 | 11/1993 |
| JP | 2002-005620 | 1/2002 |

OTHER PUBLICATIONS

International Search Report corresponding to International Application No. PCT/JP2004/013557.

* cited by examiner

*Primary Examiner* — Que T Le
(74) *Attorney, Agent, or Firm* — Fay Sharpe LLP (57) ABSTRACT

As shown in FIG. 1, a position detector (10) includes: an object to be detected having a pattern (2) formed for generating a position signal; and a sensor (3) for detecting the position signal according to the pattern (2) by receiving an electromagnetic wave generated on the object (1) by light irradiation. The pattern (2) is formed in a gradation shape visibly or invisibly so that an electromagnetic wave having a wavelength continuously different depending on the position on the object (1) can be sent to the sensor (3). This enables detection of an absolute angle of a rotary object and an absolute position on an XY plane with a simpler configuration, simplifies the device assembly, and reduces the device size.

20 Claims, 9 Drawing Sheets

POSITION DETECTOR AND A DETECTED ELEMENT HAVING A PATTERN FOR GENERATING A POSITION SIGNAL FORMED THEREON

TECHNICAL FIELD

The present invention relates to a position detector and a detected element, and in particular, to the position detector and detected element which are novel and capable of detecting an absolute angle of a rotating object and an absolute position on an XY plane, facilitating assembly, miniaturizing an apparatus and reducing costs.

BACKGROUND ART

To acquire an absolute angle of a rotating object, there is a conventionally used method of detecting an encoded pattern with a sensor having a high resolution, such as an absolute encoder.

Figure 12A:
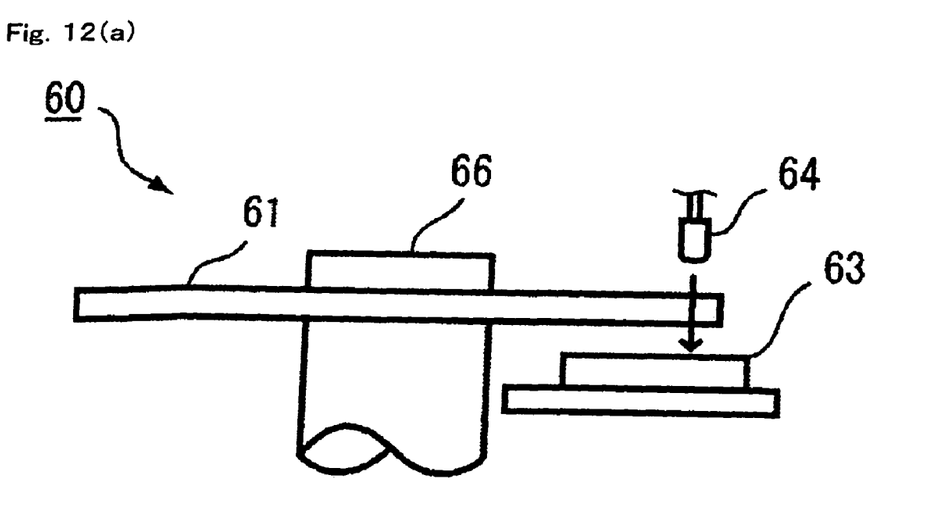
FIG. 12(a) is an explanatory diagram showing an example of a conventional method for detecting an absolute angle, which is a side view of an encoder substantial part.
Figure 12B:
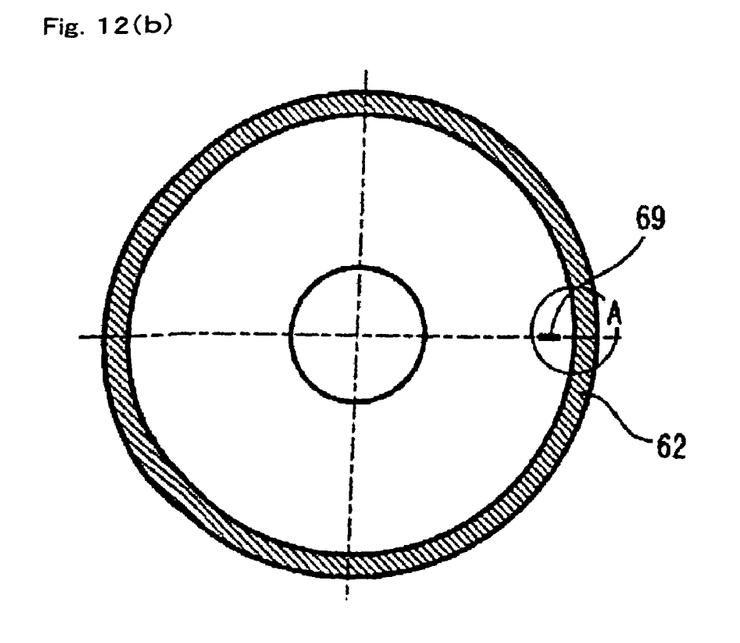
FIG. 12(b) is an explanatory diagram showing an example of the conventional method for detecting an absolute angle, which is a plan view of a disk of an absolute encoder.
Figure 12C:
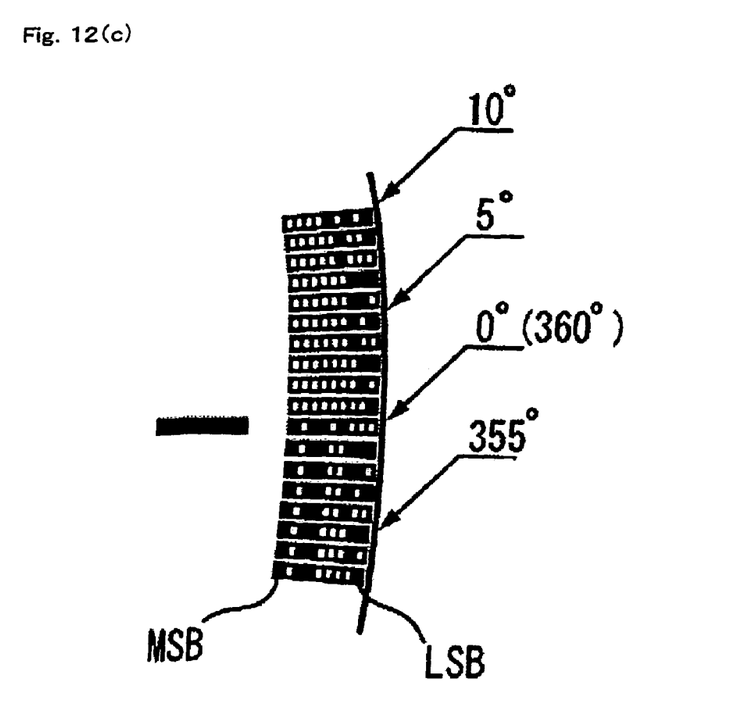
FIG. 12(c) is an explanatory diagram showing an example of the conventional method for detecting an absolute angle, which is an enlarged view of a part A in FIG. 12(b).

FIGS. 12(a) to (c) are explanatory diagrams showing an example of such a conventional method of detecting the absolute angle. Of these, FIG. 12(a) is a side view of a substantial part of the encoder, FIG. 12(b) is a plan view of a disk of the absolute encoder, and FIG. 12(c) is an enlarged view of a part A in FIG. 12(b). As shown therein, an absolute encoder 60 has a pattern 62 which is a binary n-bit code cut into slits and encoded by angle formed on an absolute position detecting disk 61. Furthermore, a one-rotation detecting pattern 69 for detecting an origin is provided. In particular, the pattern encoded by angle is formed by a significantly advanced manufacturing technology.

There are also the following conventional technologies as to detection of the number of rotations and angle of rotation. To be more specific, there are a method of detecting the number of rotations by using multiple light sources for radiating light of different properties on an NMR apparatus (Patent Document 1 listed below), a method of changing a degree of monochromatic coloring on axial periphery and thereby knowing an axial displacement (Patent Document 2).

Patent Document 1: Japanese Patent Laid-Open No. 2001-215239, "Body of Rotation Detector", Abstract, claims and FIG. 3

Patent Document 2: Japanese Patent Laid-Open No. 1-277704, "Rotation Axis Displacement Detector", Abstract, claims and FIG. 1

As described above, in the conventional method of detecting the absolute angle, formation of a pattern encoded by angle requires a significantly advanced manufacturing technology, and so a body of rotation should be in a certain size or larger. As a characteristic of detection is influenced by positions and the like of the configured sensors and light sources, positioning thereof requires high accuracy and manufacturing involves considerable difficulties. Therefore, miniaturization and cost reduction of a detector is difficult. Furthermore, it is impossible detect a position on an XY plane.

Such a technical limit remains basically unsolved even in proposals indicated in the above-mentioned Patent Documents.

An object to be attained by the present invention is to provide a position detector and a detected element which are rid of the problems of the conventional technologies and capable of detecting an absolute angle of a rotating object and an absolute position on an XY plane by using a simpler configuration and an easier method, facilitating assembly of an apparatus, miniaturizing the apparatus and reducing costs thereof.

DISCLOSURE OF THE INVENTION

As a result of considering the object, the inventors hereof found out that the object is attainable by configuring a detected element such as a body of rotation to be able to reflect an electromagnetic wave of a wavelength continuously changing according to a position, which led to the present invention. To be more specific, the invention claimed or at least disclosed by the present application as means for attaining the object is as follows.

(1) A position detector comprising: a detected element having a pattern for generating a position signal formed thereon; and a sensor for detecting the position signal based on the pattern by receiving an electromagnetic wave generated on the detected element by light irradiation, characterized in that the pattern is visibly or invisibly formed like gradation to be able to send out the electromagnetic wave of a wavelength continuously different according to a position on the detected element to the sensor side.

(2) The position detector according to (1), characterized in that the pattern is one of the following:

(2-I) a pattern for receiving light from a light emitting element forming a part of the sensor or provided separately from the sensor so as to reflect the electromagnetic wave of the wavelength different according to the position on the detected element onto the light receiving element forming a part of the sensor;

(2-II) a pattern for receiving light from a light emitting element forming a part of the sensor or provided separately from the sensor so as to transmit the electromagnetic wave of a wavelength different according to the position on the detected element to a light receiving element forming a part of the sensor;

(2-III) a pattern for receiving light from a light emitting element forming a part of the sensor or provided separately from the sensor so as to generate the electromagnetic wave of the wavelength different according to the position on the detected element by means of fluorescence excitation or the like and irradiate a light receiving element forming a part of the sensor therewith.

(3) The position detector according to (1) or (2), characterized in that: the sensor has a wavelength separating portion such as a spectral spectrograph or a primary color filter for separating the electromagnetic wave from the detected element into the wavelengths; and the position is detected based on the wavelengths thereby separated and obtained.

(4) The position detector according to any one of (1) to (3), characterized in that the detected element is in a disk-like form to have a position in a rotation direction detected; and a pattern for generating the electromagnetic wave of a different wavelength to be sent out to the sensor side is formed in the rotation direction so as to detect a rotational position of the detected element by means of such a configuration. (5) The position detector according to any one of (1) to (3), characterized in that: the detected element is in a parallelogrammic form to have a position on a coordinate plane detected; and a pattern for generating the electromagnetic wave of a different wavelength to be sent out to the sensor side is formed in a quadrant thereof so as to detect a coordinate position of the detected element by means of such a configuration. (6) The position detector according to any one of (1) to (3), characterized in that: the detected element is in a spherical form to have a position on a spherical surface detected; and a pattern for generating the electromagnetic wave of a different wavelength to be sent out to the sensor side is formed on the spherical surface so as to detect a position on the spherical surface of the detected element by means of such a configuration.

(7) The position detector according to any one of (4) to (6), characterized in that the detected element has an origin for position detection provided thereon by a part of the pattern or a pattern separately provided so as to be capable of detecting an absolute position.

(8) The position detector according to any one of (4) to (7), characterized in that the pattern is formed by colors or coloring continuously changing according to the position.

(9) The position detector according to (8), characterized in that the pattern consists of multiple basic colors provided at different positions on a detected position and colors placed continuously between adjacent two of the basic colors and based on a color mixing ratio between them.

(10) The position detector according to (9), characterized in that the basic colors are two or more primary colors including the cases of the three primary colors of colored rays or three primary colors of colored materials.

(11) A detected element having a position signal generating pattern for generating an electromagnetic wave by light irradiation formed thereon, characterized in that the pattern is visibly or invisibly formed like gradation to be able to generate the electromagnetic wave of a wavelength continuously different according to a position on the detected element.

(12) The detected element according to (11), characterized in that the pattern is formed like gradation by color or coloring continuously changing according to the position and is in a disk-like form to have a position in a rotation direction detected.

(13) The detected element according to (11), characterized in that the pattern is formed like gradation by color or coloring continuously changing according to the position and is in a parallelogrammic form to have a position on a coordinate plane detected.

(14) The detected element according to (11), characterized in that the pattern is formed like gradation by color or coloring continuously changing according to the position and is in a spherical form to have a position on a spherical surface detected.

(15) The detected element according to (11), characterized in that the pattern is formed like gradation by color or coloring continuously changing according to the position and is in a belt-like form to have a position in a certain direction detected.

(16) The detected element according to (11), characterized in that the pattern is formed like gradation by color or coloring continuously changing according to the position and is in a cylindrical form to have a position in a rotation direction detected.

As the position detector and the detected element of the present invention are configured as described above, it is thereby possible to detect an absolute angle of a rotating object, an absolute position on an XY plane and the like by using a simpler configuration and an easier method. It is thus possible to facilitate assembly of an apparatus, miniaturize the apparatus and reduce costs thereof.

BRIEF DESCRIPTION OF THE DRAWINGS

FIG. 9-A is a diagram showing another configuration example of the detected element of the position detector for detecting a position on an XY coordinate plane;

FIG. 9-B is a diagram showing a further configuration example of the detected element of the position detector for detecting a position on an XY coordinate plane;

FIG. 9-C is a diagram showing a still further configuration example of the detected element of the position detector for detecting a position on an XY coordinate plane;

DESCRIPTION OF SYMBOLS 1, 11, 21, 31, 41, 201, 271, 411 . . . detected elements
251-A, 251-B, 251-C, 261-A, 261-B, 261-C, 261-D, 261-E . . . detected elements
2, 12, 22, 32, 42, 202, 272, 412, 422 . . . patterns for generating a position signal
252-A, 252-B, 252-C, 262-A, 262-B, 262-C, 262-D, 262-E . . . patterns for generating a position signal 3, 13, 33 . . . sensors, 4A, 14A . . . light emitting elements, 4B, 14B . . . light emitting elements, 5, 15 . . . light receiving element, 6, 36 . . . rotation axes, 10, 20, 30 . . . position detectors 2201, 2202, 2203 . . . basic color peak positions 3201, 3202, 3203 . . . basic color peak positions 60 . . . absolute encoder, 61 . . . absolute position detecting disk, 62 . . . encoded pattern, 63 . . . sensor, 64 . . . light source, 66 . . . rotation axis, 69 . . . one-rotation detecting pattern

BEST MODE FOR CARRYING OUT THE INVENTION

The present invention will be described in detail below with reference to the drawings.

Figure 1:
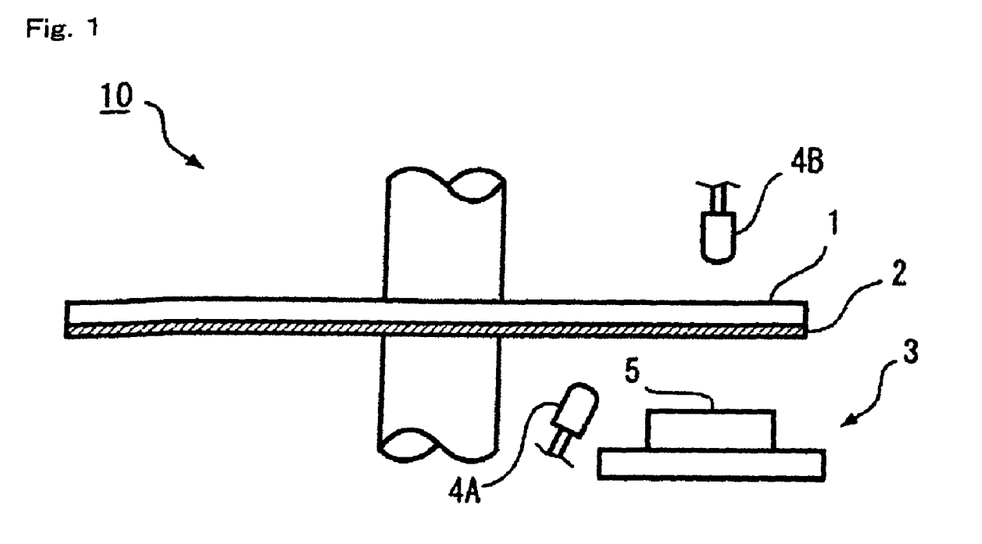
FIG. 1 is an explanatory diagram showing a basic configuration of a position detector of the present invention.

FIG. 1 is an explanatory diagram showing a basic configuration of a position detector of the present invention. FIG. 1 is conceptually configured to facilitate a description. There are also such cases as to the following drawings.

In FIG. 1, as a main configuration, a position detector 10 of the present invention consists of a detected element 1 having a pattern 2 for generating a position signal formed thereon and a sensor 3 for detecting the position signal based on the pattern 2 by receiving an electromagnetic wave generated on the detected element 1 by light irradiation. The pattern 2 is visibly or invisibly formed like gradation to be able to send out the electromagnetic wave of a wavelength continuously different according to a position on the detected element 1 to the sensor 3 side.

In FIG. 1, the position detector 10 is provided with a light emitting element 4A as a part of the sensor 3 or independently from the sensor 3, and the sensor 3 is provided with a light receiving element 5 as a part of it. Here, the pattern 2 is configured to receive light from the light emitting element 4A and reflect the electromagnetic wave of a wavelength different according to the position on the detected element 1 onto the light receiving element 5 forming a part of the sensor 3.

According to such a configuration, the position detector 10 of the present invention has the light emitted from the light emitting element 4A reflected on the pattern 2. In that case, the electromagnetic wave of a wavelength continuously different according to a position on the detected element 1 is sent out to the sensor 3 side and detected due to a visible or invisible gradation-like configuration of the pattern 2.

To be more specific, the electromagnetic wave of a different wavelength to be detected has positional information on the detected element 1 so as to allow the position of the detected element to be detected by the sensor 3. It is possible to detect an absolute position of the detected element 1 easily by identifying a specific position of the detected element 1 by the wavelength of the electromagnetic wave in advance and storing that information.

FIG. 1 shows the detected element 1 as a body of rotation. However, the present invention is not limited thereto but may also be used for position detection on an XY plane as will be described later. In short, the present invention includes within its scope any method of configuring a surface or a part as a position detection subject in a visible or invisible gradation-like pattern whether it is a rotation-direction position (angle) or a position on the XY plane and thereby generating a position-dependent electromagnetic wave by light irradiating action on the pattern so as to obtain the positional information by detecting the electromagnetic wave. Therefore, the surface or a part as a position detection subject is not limited to a plane, but the position detecting method of the present invention may also be used for a curved surface such as a spherical surface.

Here, the pattern 2 can send out the electromagnetic wave of a wavelength continuously different according to the position on the detected element 1. This means that the pattern 2 generates reflected light and transmitted light by receiving irradiation from an external light source (4A or the like) or generates fluorescence by being fluorescence-excited. The pattern 2 on the detected element 1 is formed so as to generate a color (visible light) or invisible light specific to that position in that case.

"Being visibly or invisibly gradation-like" means that the pattern 2 has the electromagnetic wave having a wavelength specific to the position generated by such irradiation, and the electromagnetic wave is in a continuously changing pattern along with the position on the detected element 1.

In FIG. 1, it is also possible to have a configuration in which the position detector 10 is provided with a light emitting element 4B as a part of the sensor 3 or independently from the sensor 3, and the sensor 3 is provided with the light receiving element 5 as a part of it. Here, the pattern 2 is configured to receive light from the light emitting element 4B and transmit the electromagnetic wave of a wavelength different according to the position on the detected element 1 to the light receiving element 5 forming a part of the sensor 3.

According to such a configuration, the position detector 10 of the present invention has the light emitted from the light emitting element 4B transmitted by the pattern 2. In that case, the electromagnetic wave of a wavelength continuously different according to the position on the detected element 1 is sent out to the sensor 3 side and detected due to a visible or invisible gradation-like configuration of the pattern 2.

In FIG. 1, it is also possible to have a configuration in which the position detector 10 is provided with the light emitting element 4A or 4B as a part of the sensor 3 or independently from the sensor 3, and the sensor 3 is provided with the light receiving element 5 as a part of it. Here, the pattern 2 receives light from the light emitting element 4A or 4B and generates the electromagnetic wave of a wavelength different according to the position on the detected element 1 by fluorescence excitation or the like to irradiate the light receiving element 5 forming a part of the sensor 3.

According to such a configuration, the position detector 10 of the present invention has fluorescence emitted on the pattern 2 by the light emitted from the light emitting element 4A or 4B. In that case, the electromagnetic wave of a wavelength continuously different according to the position on the detected element 1 is sent out to the sensor 3 side and detected due to the visible or invisible gradation-like configuration of the pattern 2.

The sensor 3 can be configured to have a wavelength separating portion for separating the electromagnetic wave from the detected element 1 into the wavelengths and detect the position based on the wavelengths thereby separated and obtained. A spectral spectrograph or a primary color filter can be used as the wavelength separating portion.

Figure 2A:
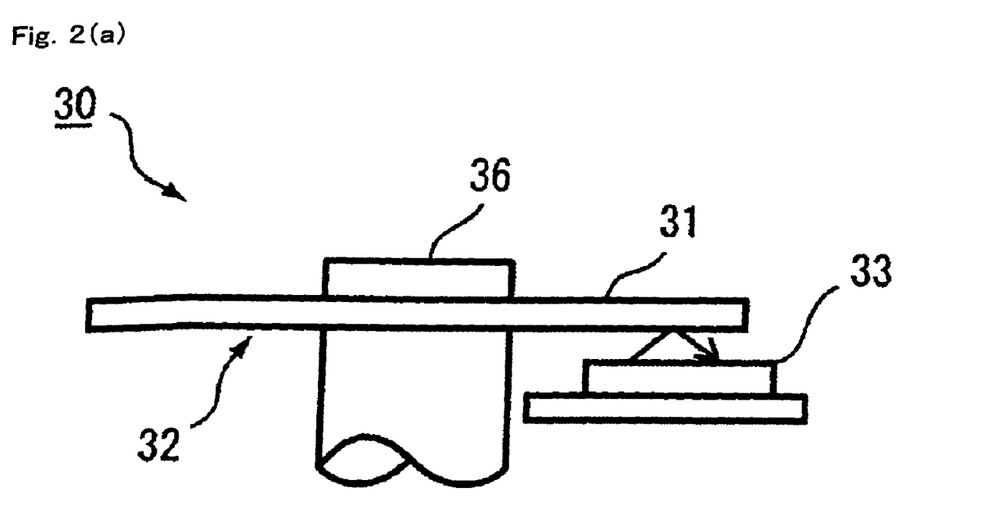
FIG. 2(a) is an explanatory diagram and a side view about the position detector of the present invention for detecting a rotational position.
Figure 2B:
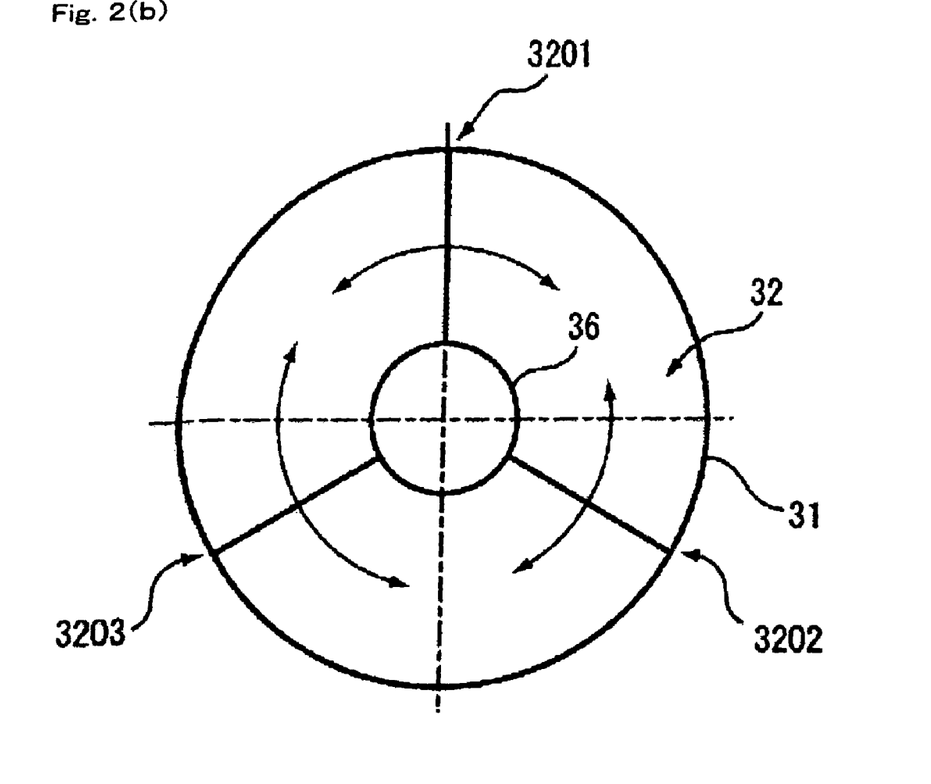
FIG. 2(b) is an explanatory diagram and a plan view about the position detector of the present invention for detecting a rotational position.
Figure 2C:
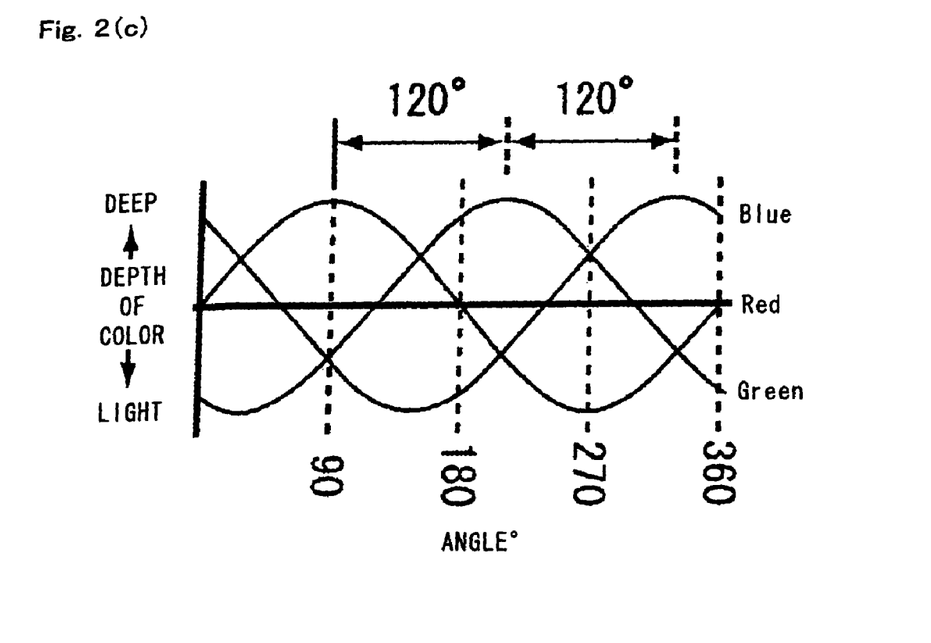
FIG. 2(c) is an explanatory diagram about the position detector of the present invention for detecting a rotational position, which is a graph showing the rotational position of a detected element and an example of a status of electromagnetic wave generation in conjunction therewith.

FIG. 2 are explanatory diagrams about the position detector of the present invention for detecting a rotational position.

Of these, FIG. 2(a) is a side view.

FIG. 2(b) is a plan view thereof.

And FIG. 2(c) is a graph showing the rotational position of the detected element and an example of a status of electromagnetic wave generation in conjunction therewith.

In FIG. 2, a position detector 30 has a main configuration in which a detected element 31 is in a disk-like form to have a position in a rotation direction detected and has a pattern 32 for generating the electromagnetic wave of a different wavelength to be sent out to the sensor 33 side formed in the rotation direction. Here, a placement relation between the light emitting element and the light receiving element is not limited, and the electromagnetic wave can be sent from the pattern 32 to the sensor 33 by using either method of transmission or fluorescence other than the shown method of reflection. This also applies to the following example.

According to such a configuration, the position detector 30 has the electromagnetic wave generated in the pattern 32 having received light from the light emitting element based on a specific pattern provided according to the rotational position of the detected element 31. The electromagnetic wave is sent out to the sensor 33 so as to detect the rotational position of the detected element 31. The position detector for detecting the rotational position of the present invention can be used on an encoder for instance.

As for the detection by the sensor 33, the electromagnetic wave sent from the detected element 31 is dispersed and detected by wavelength by the wavelength separating portion such as a primary color filter or a spectral prism. The electromagnetic wave is thereby identified so as to obtain the information on the rotational position identified by the electromagnetic wave.

Because of such a system, it does not require as high accuracy as before and a rough placement is possible when deciding a placement position of the sensor 33 against the detected element 31. It is thus possible to miniaturize the apparatus, facilitate manufacturing of the apparatus and reduce costs thereof.

Such a method of wavelength dispersion and detection of the sensor is used not only in the case of detecting the rotational position but also in the entirety of the present invention.

Figure 3:
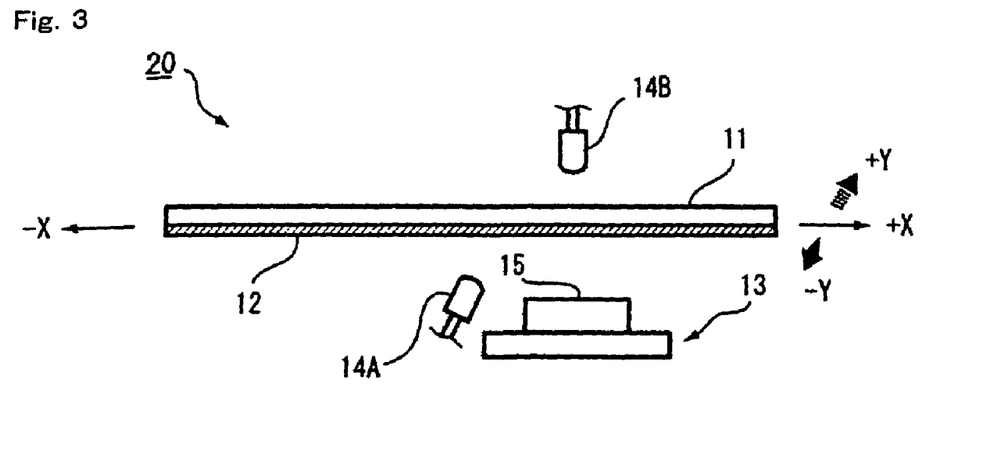
FIG. 3 is an explanatory diagram showing a side configuration of the position detector of the present invention for detecting a position on an XY plane.

FIG. 3 is an explanatory diagram showing a side configuration of the position detector of the present invention for detecting a position on an XY plane. In FIG. 3, a position detector 20 has the detected element 11 in a parallelogrammic form to have a position on a coordinate plane detected, and a pattern 12 for generating the electromagnetic wave of a different wavelength to be sent out to a sensor 13 side is formed in a quadrant thereof. It goes without saying that the parallelogrammic forms also include a rectangle, a square and a lozenge. As for the light emitting element, a reflection type 14A, a transmission type 14B or a fluorescence excitation type may be used as appropriate.

According to such a configuration, the position detector 20 has the electromagnetic wave generated based on a specific pattern provided according to an XY-direction position (+X, +Y, -X, -Y) of the detected element 11 in the pattern 12 receiving light from the light emitting element. The electromagnetic wave is sent out to the sensor 13 to detect the coordinate position of the detected element 11. The position detector of the present invention for detecting a position on an XY plane can be used on an XY table for instance.

Figure 4:
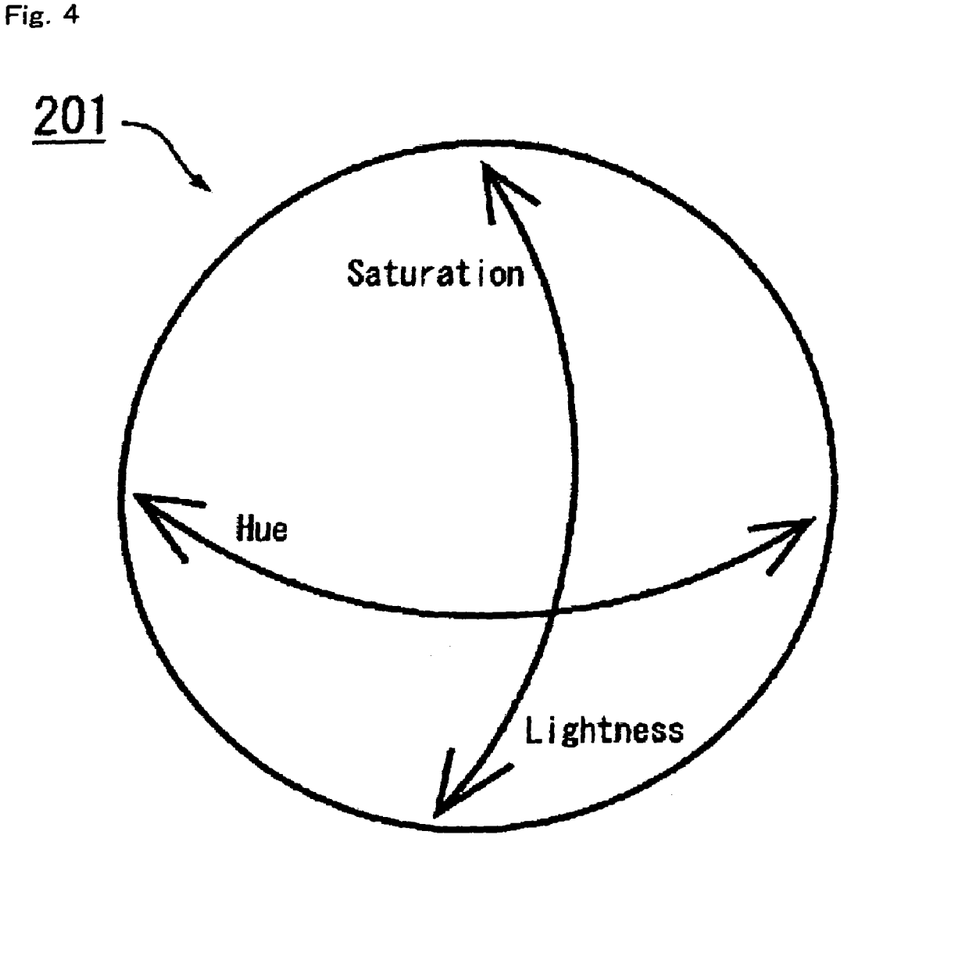
FIG. 4 is an explanatory diagram showing an example of a method for configuring a pattern on a spherical surface as to the position detector of the present invention for detecting a position on a spherical surface.

FIG. 4 is an explanatory diagram showing an example of a method for configuring a pattern on a spherical surface as to the position detector of the present invention for detecting a position on a spherical surface.

Figure 5:
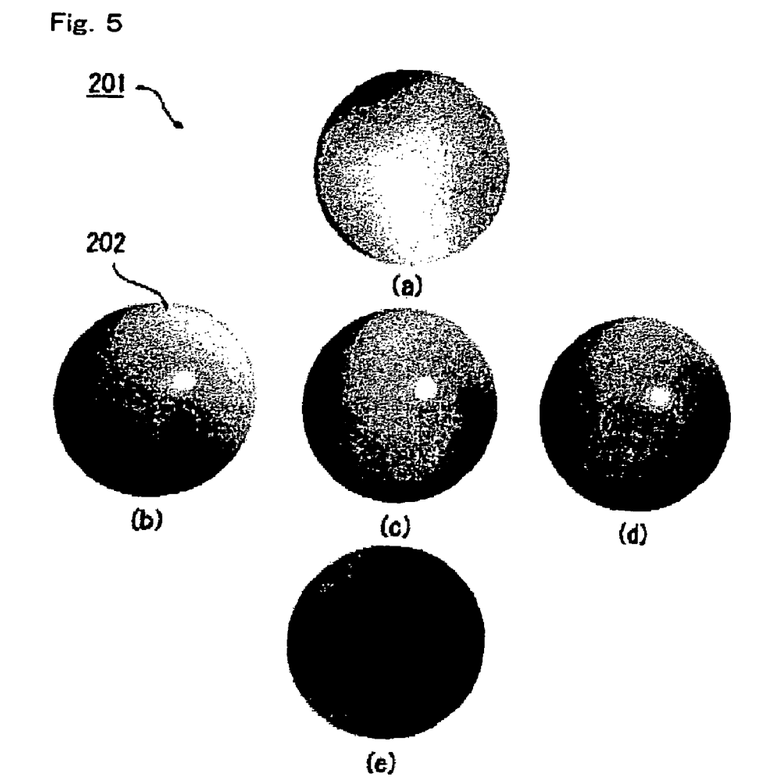
FIG. 5 are explanatory diagrams showing pattern configuration examples on the detected element for detecting a position on a spherical surface according to other examples.

FIG. 5 are explanatory diagrams showing pattern configuration examples on the detected element for detecting a position on a spherical surface according to other examples. (a), (b) to (d) and (e) are the examples observed from a top face direction, three side directions and a bottom direction respectively. In these diagrams, the detected element 201 is in a spherical form to have a position on the spherical surface detected. A pattern 202 for generating the electromagnetic wave of a different wavelength to be sent out to the sensor side is formed on the spherical surface so as to detect a position on the spherical surface of the detected element 201 by means of such a configuration.

As exemplified in FIG. 4, it is possible, for instance, to combine the patterns for continuously changing hues, saturation or intensity or both of them in an equatorial (latitude) or longitude direction on the spherical surface so as to form the pattern 202 on the spherical surface. In this case, it is also possible to use a combined pattern for placing the pattern of hues based on the three primary colors of colored rays at 360° in the latitude direction and the pattern of brightness and saturation at 180° in the longitude direction.

According to such a configuration, the position detector has the electromagnetic wave generated based on a specific pattern 202 provided according to the position on the spherical surface of the detected element 201 in the pattern 202 receiving light from the light emitting element. The electromagnetic wave is sent out to the sensor (not shown) to detect the position on the spherical surface of the detected element 201. The position detector of the present invention for detecting the position-on the spherical surface can be used for control of joint movement in robotics for instance.

As for the position detectors of the present invention described above, the detected element can be provided with an origin for position detection by a part of the pattern or a pattern separately provided. It facilitates detection of an absolute position.

As exemplified by the position detector for detecting a rotational position of FIG. 2(b), the position detector 30 of the present invention can have the pattern 32 formed in colors continuously changing according to the position. The pattern 32 can be formed in colors continuously changing according to the position. Needless to say, this is not limited to FIG. 2(b) but is also applicable to detection of a position on the XY plane and a position on the spherical surface described above, and a coordinate position in a certain direction, a rotational position on a periphery of a cylinder and other positions described later.

In FIG. 2(b), the pattern 32 can be configured by multiple basic colors provided at different positions 3201, 3202 and 3203 on a detected position and colors placed continuously between adjacent two of the basic colors and based on a color mixing ratio between them. Needless to say, this is not limited to FIG. 2(b) but is also applicable to detection of a position on the XY plane and a position on the spherical surface described above, and a coordinate position in a certain direction, a rotational position on a periphery of a cylinder and other positions described later.

To be more specific, as for the color continuously changing according to the position, it is possible to use a color group which is a single color as the hue and has changes generated by continuous color mixture between its pure color and gray, that is, a color group of continuously different saturation. It is also possible to use a color group which is a single color as the hue and has changes generated by continuous color mixture between its pure color and white and between its pure color and black, that is, a color group of continuously different brightness. It is also possible to use a pattern of color mixture of two different hues or color mixture of three or more different hues.

FIG. 2(c) is a graph showing a relation between the rotational position (angle) and color density in the case where the peaks 3201, 3202 and 3203 of FIG. 2(b) are red (R), green (G) and blue (B). It is possible to detect the absolute position because the rotational position is identified by a color generated by mixing the colors.

As for the position detectors of the present invention described above, it is possible to render the basic colors as two or more primary colors and further use red (R), green (G) and blue (B) as the three primary colors of colored rays or cyan (C), yellow (Y) and magenta (M) as the three primary colors of colored materials.

The detected elements related to the position detectors described above are also the invention claimed by the present application. A description will be given below as to concrete configuration examples thereof.

Figure 6:
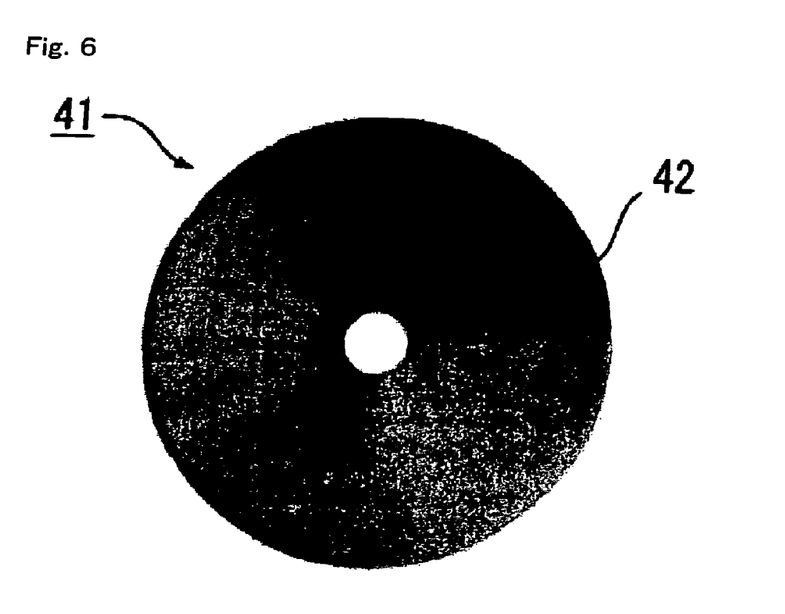
FIG. 6 is a diagram showing a configuration example of the detected element of the position detector for detecting a rotational position.

FIG. 6 is a diagram showing a configuration example of the detected element of the position detector for detecting the rotational position. As shown in FIG. 6, a detected element 41 can have a configuration in which the pattern 42 is formed like gradation by color or coloring continuously changing according to the position and is in a disk-like form to have the position in the rotation direction detected. To be more specific, the detected element 41 of the present invention can be provided with continuously changing different colors in the rotation direction, where the positional information identified by each of the colors is obtained by detecting each of the colors. For instance, it is possible to place the basic colors such as the three primary colors of colored rays or colored materials at the positions on a circumference divided by 120° or the like so as to form a pattern of gradation among them.

In the case where the present invention is applied to a rotation detector as shown in the examples described in FIGS. 2 and 6, the pattern 42 is formed, in which the peaks of the three primary colors are placed on the circumference divided by 120° and coloration is performed by linearly changing a mixing ratio of the three colors. The reflected light and the like generated by receiving irradiation from the light emitting element are dispersed by wavelength by means of the primary color filter, spectral prism or the like, and the density of each of the colors is measured and detected so as to detect the color subjected to light and thereby detect the absolute position of the rotational position.

Figure 7:
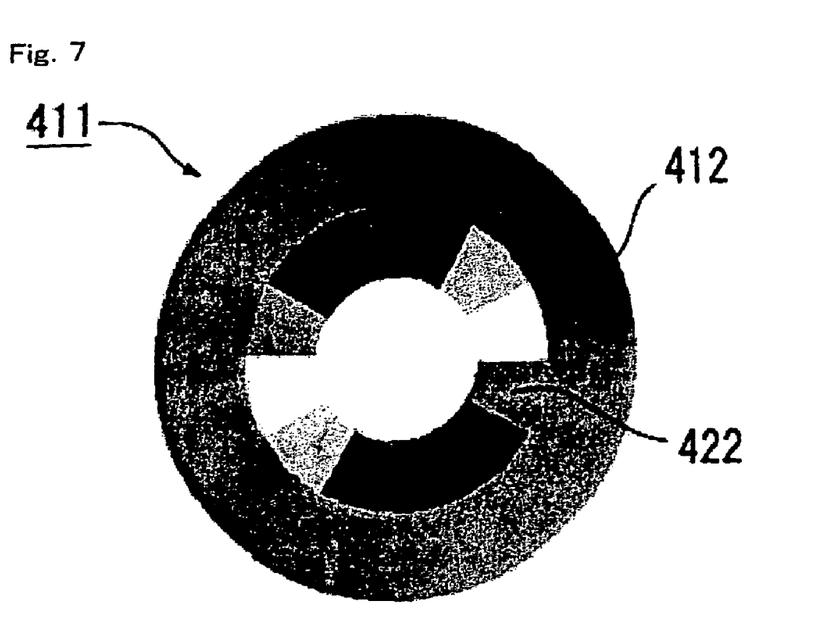
FIG. 7 is a diagram showing another configuration example of the detected element of the position detector for detecting a rotational position.

FIG. 7 is a diagram showing another configuration example of the detected element of the position detector for detecting the rotational position. As shown in FIG. 7, a detected element 411 can have two kinds of patterns 412 and 422 concentrically provided on the disk. As shown in FIG. 7, one of them is the pattern like FIG. 6 (412), and there is the pattern 422 different from it inside. For instance, the pattern 422 can be a pattern consisting of different colors from the pattern 412 at the same angular position. In addition, it can be a pattern not gradation-like while adjacent colors are discontinuous in at least one of the brightness, saturation and hue. Such a configuration allows multiple kinds of angular positions to be detected.

Figure 8:
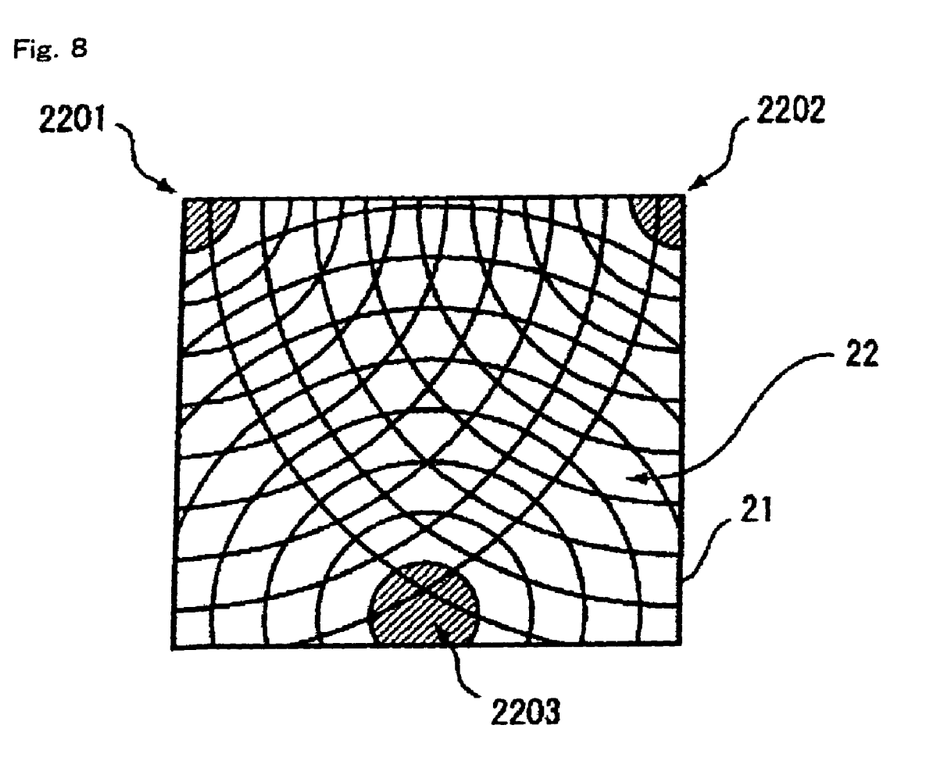
FIG. 8 is a diagram showing a configuration example of the detected element of the position detector for detecting a position on an XY coordinate plane, which is a plan view showing a pattern example of the position detector for detecting a position on an XY coordinate plane shown in FIG. 3.

FIG. 8 is a diagram showing a configuration example of the detected element of the position detector for detecting a position on the XY coordinate plane, which is a plan view showing a pattern example of the position detector for detecting the position on the XY coordinate plane shown in FIG. 3. As shown in FIG. 8, a detected element 21 can be configured to have the pattern 22 formed like gradation by color or coloring continuously changing according to the position and in a parallelogrammic form to have a position on the coordinate plane detected. As shown in FIG. 8, it is possible to set peaks 2201, 2202, 2203 at appropriate positions of the pattern 22 such as a corner position and a midpoint of a side so as to form a gradation pattern.

Figure 9:
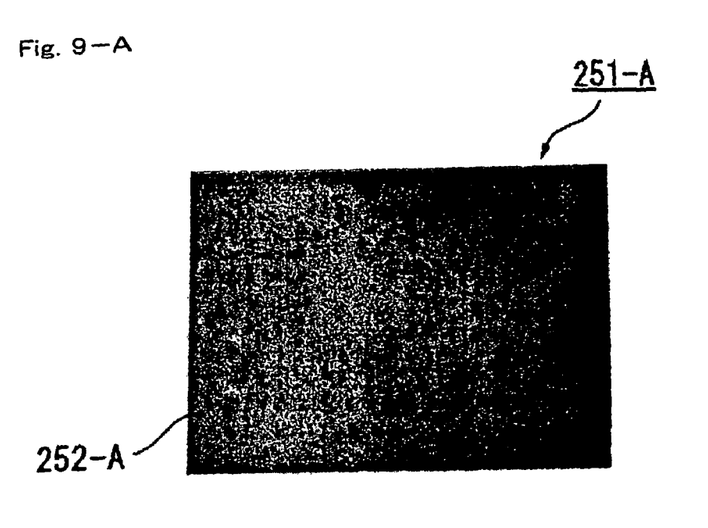

FIGS. 9-A, 9-B and 9-C are diagrams showing different configuration examples of the detected element of the position detector for detecting a position on the XY coordinate plane respectively. As shown in these drawings, detected elements 251-A, 251-B and 251-C can have the patterns (252-A, 252-B) in which three basic colors are placed at appropriate positions on the XY coordinate plane. In this case, it is possible, for instance, to place the colors at three angles of the four angles respectively or trisect all circumferences and place the colors on the positions thereon as appropriate.

It is also possible to render it as a pattern (252-C) having the hues placed in a horizontal direction and the saturation or intensity or both of them placed in a vertical direction. In this case, it is possible, for instance, to place one of the three colors at both the right and left ends and place the other two colors in an intermediate portion at adequate intervals as appropriate.

As described by using FIGS. 4 and 5, this detected element has the pattern formed like gradation by color or coloring continuously changing according to the position and is in the spherical form to have a position on the spherical surface detected.

Figure 10:
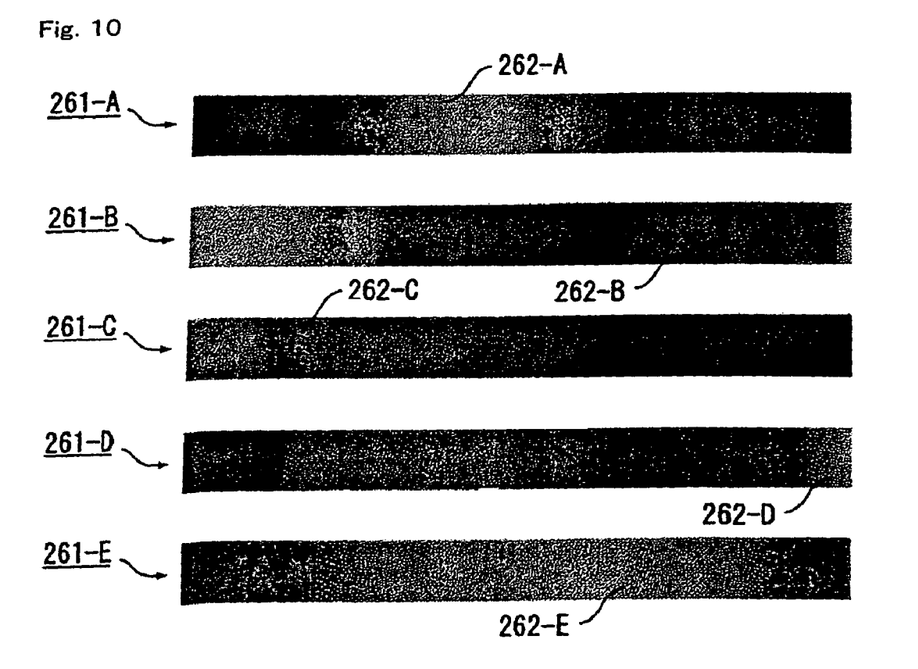
FIG. 10 is a diagram showing another configuration example of the detected element of the position detector for detecting a coordinate position in a certain direction.

FIG. 10 is a diagram showing another configuration example of the detected element of the position detector for detecting a coordinate position in a certain direction. As shown in FIG. 10, a detected element 261-A and the like can have a configuration in which the patterns 262-A and the like are formed like gradation by color or coloring continuously changing according to the position and are in a belt-like form to have a position in a certain direction detected.

Here, it is possible, as with the detected elements 261-A, 261-B and 261-C, to have patterns (262-A, 262-B and 262-C) in which there are three basic colors placed at adequate positions on a belt-like element. It is also possible to have patterns (262-D and 262-E) in which there are two basic colors. As for the method of placing the basic colors, it is possible, in the case of using three colors, to adequately place the same basic color at both ends of the belt-like element and the other two colors inside as appropriate for instance. It is similarly possible, in the case of using two colors, to place the respective basic colors at both ends.

Figure 11:
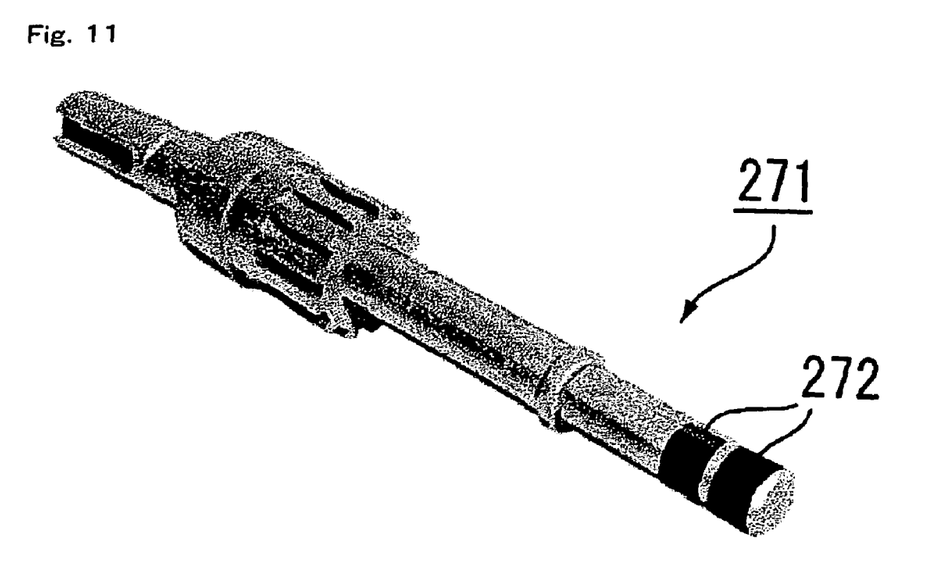
FIG. 11 is a diagram showing a configuration example of the detected element of the position detector for detecting a rotational position.

FIG. 11 is a diagram showing a configuration example of the detected element of the position detector for detecting the rotational position. As shown in FIG. 11, a detected element 271 can have a configuration in which the pattern 272 is formed like gradation by color or coloring continuously changing according to the position and is in a cylindrical form to have a position in the rotation direction detected. Although two patterns are formed in FIG. 11, there may be a single pattern as a matter of course. As for the method of placing the colors, the configuration may be the same as the aforementioned disk-like detected element for instance. The detected element 271 may be provided on a shaft of a motor, for instance, to be used for detection of a motor rotational position.

INDUSTRIAL APPLICABILITY

As the position detector and detected element of the present invention are configured as described above, it is possible to detect an absolute angle of a rotating object and an absolute position on an XY plane by using a simpler configuration and an easier method. It is thus possible to facilitate assembly of an apparatus, miniaturize the apparatus and reduce costs thereof. Therefore, this is an invention having a great deal of potential in industry starting with the FA and OA fields.

The invention claimed is:

1. A position detector comprising:
a detected element having a pattern for generating a position signal formed thereon; and a sensor for detecting the position signal based on the pattern by receiving an electromagnetic wave generated on the detected element by light irradiation, characterized in that:

the pattern is visibly or invisibly formed like gradation so as to generate a color (visible light) or invisible light specific to that position to be able to send out the electromagnetic wave of a wavelength continuously different according to a position on the detected element to the sensor side, and to be able to detect an absolute position of the detected element.

2. The position detector according to claim 1, characterized in that the pattern is one of the following:

(I) a pattern for receiving light from a light emitting element forming a part of the sensor or provided separately from the sensor so as to reflect the electromagnetic wave of the wavelength different according to the position on the detected element onto the light receiving element forming a part of the sensor;

(II) a pattern for receiving light from a light emitting element forming a part of the sensor or provided separately from the sensor so as to transmit the electromagnetic wave of a wavelength different according to the position on the detected element to a light receiving element forming a part of the sensor;

(III) a pattern for receiving light from a light emitting element forming a part of the sensor or provided separately from the sensor so as to generate the electromagnetic wave of the wavelength different according to the position on the detected element by means of fluorescence excitation or the like and irradiate a light receiving element forming a part of the sensor therewith.

3. The position detector according to claim 1, characterized in that:

the sensor has a wavelength separating portion such as a spectral spectrograph or a primary color filter for separating the electromagnetic wave from the detected element into the wavelengths; and the position is detected based on the wavelengths thereby separated and obtained.

4. The position detector according to claim 1, characterized in that:

the detected element is in a disk-like form to have a position in a rotation direction detected; and a pattern for generating the electromagnetic wave of a different wavelength to be sent out to the sensor side is formed in the rotation direction so as to detect a rotational position of the detected element by means of such a configuration.

5. The position detector according to claim 1, characterized in that:

the detected element is in a parallelogrammic form to have a position on a coordinate plane detected; and a pattern for generating the electromagnetic wave of a different wavelength to be sent out to the sensor side is formed in a quadrant thereof so as to detect a coordinate position of the detected element by means of such a configuration.

6. The position detector according to claim 1, characterized in that:

the detected element is in a spherical form to have a position on a spherical surface detected; and a pattern for generating the electromagnetic wave of a different wavelength to be sent out to the sensor side is formed on the spherical surface so as to detect a position on the spherical surface of the detected element by means of such a configuration.

7. The position detector according to claim 4, characterized in that the detected element has an origin for position detection provided thereon by a part of the pattern or a pattern separately provided so as to be capable of detecting an absolute position.

8. The position detector according to claim 4, characterized in that the pattern is formed by colors or coloring continuously changing according to the position.

9. The position detector according to claim 8, characterized in that the pattern consists of multiple basic colors provided at different positions on a detected position and colors placed continuously between adjacent two of the basic colors and based on a color mixing ratio between them.

10. The position detector according to claim 9, characterized in that the basic colors are two or more primary colors including the cases of the three primary colors of colored rays or three primary colors of colored materials.

11. A detected element having a position signal generating pattern for generating an electromagnetic wave by light irradiation formed thereon, characterized in that the pattern is visibly or invisibly formed like gradation so as to generate a color (visible light) or invisible light specific to that position to be able to generate the electromagnetic wave of a wavelength continuously different according to a position on the detected element, and to be able to detect an absolute position of the detected element.

12. The detected element according to claim 11, characterized in that the pattern is formed like gradation by color or coloring continuously changing according to the position and is in a disk-like form to have a position in a rotation direction detected.

13. The detected element according to claim 11, characterized in that the pattern is formed like gradation by color or coloring continuously changing according to the position and is in a parallelogrammic form to have a position on a coordinate plane detected.

14. The detected element according to claim 11, characterized in that the pattern is formed like gradation by color or coloring continuously changing according to the position and is in a spherical form to have a position on a spherical surface detected.

15. The detected element according to claim 11, characterized in that the pattern is formed like gradation by color or coloring continuously changing according to the position and is in a belt-like form to have a position in a certain direction detected.

16. The detected element according to claim 11, characterized in that the pattern is formed like gradation by color or coloring continuously changing according to the position and is in a cylindrical form to have a position in a rotation direction detected.

17. The position detector according to claim 2, characterized in that:

the sensor has a wavelength separating portion such as a spectral spectrograph or a primary color filter for separating the electromagnetic wave from the detected element into the wavelengths; and the position is detected based on the wavelengths thereby separated and obtained.

18. The position detector according to claim 2, characterized in that:

the detected element is in a disk-like form to have a position in a rotation direction detected; and a pattern for generating the electromagnetic wave of a different wavelength to be sent out to the sensor side is formed in the rotation direction so as to detect a rotational position of the detected element by means of such a configuration.

19. The position detector according to claim 3, characterized in that:
   the detected element is in a disk-like form to have a position in a rotation direction detected; and
   a pattern for generating the electromagnetic wave of a different wavelength to be sent out to the sensor side is formed in the rotation direction so as to detect a rotational position of the detected element by means of such a configuration.

20. The position detector according to claim 2, characterized in that:
   the detected element is in a parallelogrammic form to have a position on a coordinate plane detected; and
   a pattern for generating the electromagnetic wave of a different wavelength to be sent out to the sensor side is formed in a quadrant thereof so as to detect a coordinate position of the detected element by means of such a configuration.

* * * * *